United States Patent Office 3,236,563
Patented Feb. 22, 1966

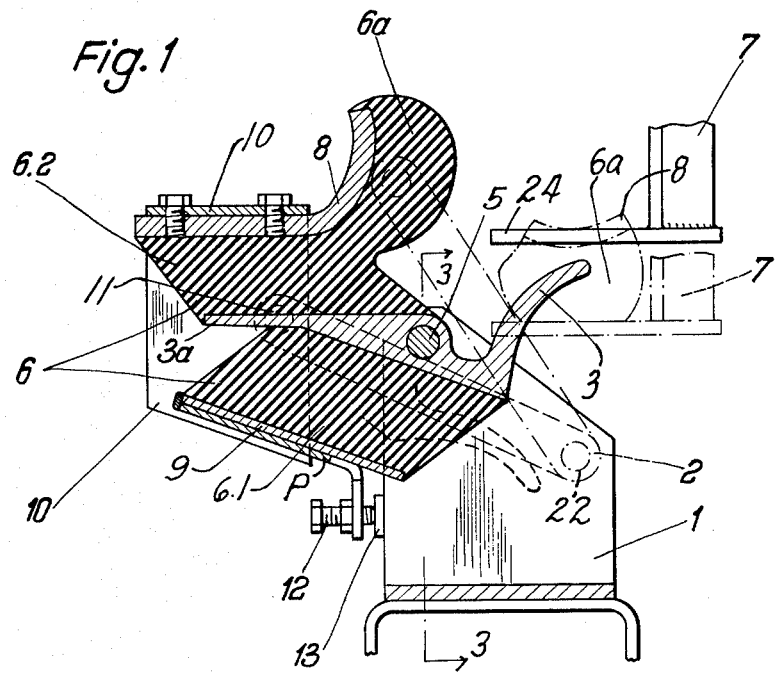
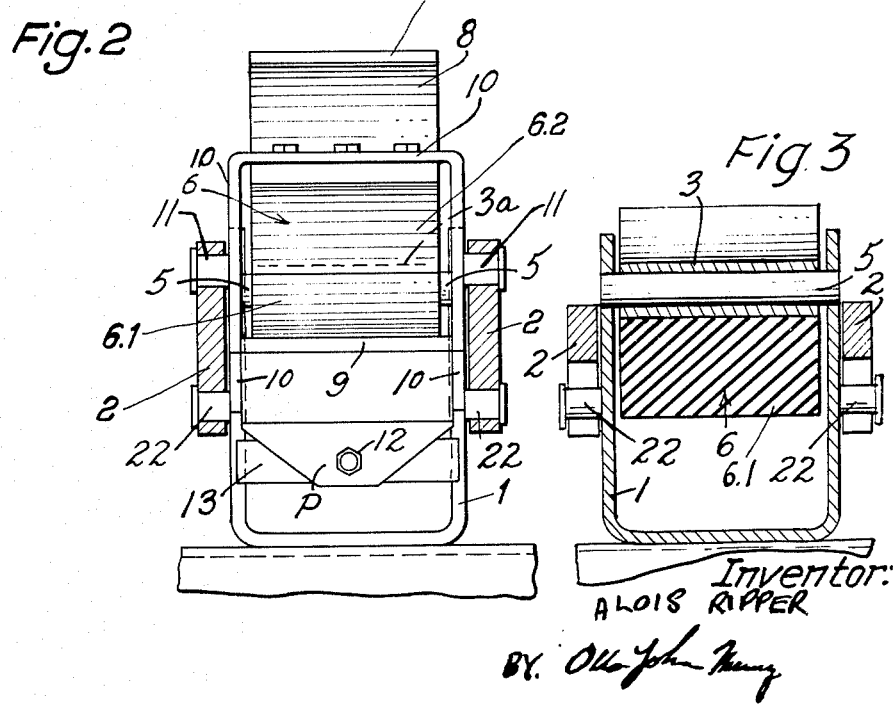

3,236,563
TILTING DUMP TRUCK LATCHING DEVICE
Alois Ripper, Sauerlach, near Munich, Germany, assignor to Metzeler Gummiwerke Aktiengesellschaft, Munich, Germany
Filed Sept. 24, 1962, Ser. No. 225,762
Claims priority, application Germany, Sept. 29, 1961, M 50,769
5 Claims. (Cl. 298—38)

The present invention concerns a device for the mutual interlocking of the tipping body and the chassis of single-side or multi-side tippers having a toggle lever catch.

According to the present invention the above mentioned locking device comprises a pivotally guided rubber-elastic stop mounted on an elastic bell-crank lever, securing the body in the position of use (loading), which stop is caused to be engaged and disengaged by the operationally actuated body.

The invention will now be described further, by way of example, with reference to the accompanying drawings, in which:

FIG. 1 is a longitudinal section of the locking device in accordance with the invention.

FIG. 2 is an end view of the apparatus shown in FIG. 1.

FIG. 3 is a section on the line 3—3 of FIG. 1 with certain parts omitted.

Guides 2 are pivotally mounted by pivots 22 relative to a fixed axis on the frame 1 of a tipping vehicle, e.g., an automotive vehicle. Furthermore a stop lever 3 is pivotally mounted on a pin 5 fixedly arranged on the frame 1. The stop lever 3 or the shank 3a thereof are substantially covered adhesively with an elastic, integral or two-part rubber member 6 or the like. Metal parts 8, 9 extending at right angles to the direction of movement of the tipping body 7 are in turn fixedly mounted on the elastic rubber member 6. The parts 3, 6, 8 and 9 may be interconnected by rubber-bonding or vulcanization. The metal parts 8, 9 in turn are non-displaceably enclosed by a housing 10. Pins 11 (FIGS. 1 and 2) are fixed on the wall surfaces of the housing 10 parallel to the pivot of the guides 2; the free ends of the guides 2 are pivotally mounted on these pins 11. Each guide 2 may be adjustable in length, e.g., by incorporation of a turnbuckle. For adjusting the locking device, it is possible, for example, to mount a stop screw 12 at a suitable point of the housing 10 such as by a plate P, which screw abuts against lugs 13 on the frame 1.

To recapitulate it is also pointed out that the stop lever 3, rubber members 6, metal parts 8, 9 and housing 10 form an elastic adjusting lever, the rubber members 6 being so fashioned that, when deflecting, they are subjected both to pressure and thrust or only to pressure or thrust. In the present case this is obtained by means of a configuration of the rubber member 6 diverging relative to the pin 5 (FIG. 1). In addition the lower part 6.1 of the rubber member 6 is arranged offset relative to the upper part 6.2 in the direction of the journal axis of the guide rods, whereby substantially equal pressures act on the rubber member 6 in the locking position.

If the tipping body 7 is moved downwardly from the tipped up position, then it is caused to act indirectly or directly by means of a stop on the stop lever 3, which is adapted optionally to have a further rubber layer worked thereon for the silent engagement of the tipping body. When the tipping body 7 makes contact with the stop lever 3, the latter and therewith the parts 6, 8, 9, 10 and 11, are swung in a clockwise direction. The guides 2 participating in this movement, stressing the rubber member 6, pass beyond the pin 5 forming the dead centre position and proceeding from there permit the parts 6, 8, 9, 10 and 11 to execute an additional rotary movement in such a manner that the part 6a of the rubber member 6, following the tendency to relieve the stress now obtaining therein, comes to rest with subsequent pressure against the tipping body 7 or the stop thereof (e.g., extension) (in the position shown in chain-dotted lines) and secures the tipping body in the transporting position, i.e., in the loading position.

If the tipping body 7 with its stop rigidly formed thereon is now moved towards the tipped up position, then it (or its stop) engages beneath the lower part 6a of the rubber member 6 on the metal part 8, lifts it and disengages the locking device so as to assume the disengaged position shown in FIG. 1.

The locking device described above may be also used without modifications of its principle in the case of tipping bodies, loading tail boards, hatches, e.g. in the case of gliders for releasing the disconnecting procedures and noise reducing for elastically pressing unloaded superstructures against their chassis. When vehicles in general, e.g. trailers, fitted with the locking device in accordance with the invention, are loaded then the locking forces are reduced and after 30 to 40 mm. loading drop of the superstructure the locking device, as explained above, is automatically disengaged.

We claim:

1. An anti-rattle catch for holding two members in non-rattling engagement comprising a latch element having a body of elastomeric material, spaced arms extending from said body, one of said arms being of elastomeric material integral with the body, the other of said arms being rigid and partly embedded in said body, means pivotally connecting said rigid arm to one of said two members, and link means pivotally connected to said one member and the elastomeric body, lines joining the pivotal connection of the arm to the pivotal connections of the link means at both ends thereof forming acute angles with a line joining the pivotal connections of the link means.

2. A device as in claim 1 wherein the spaced arms are curved.

3. A device as in claim 1 including means for putting the resilient latch under initial stress.

4. A device as in claim 3 wherein the stressing means comprises a screw adjustably mounted on the latch element and bearing against said one of said members.

5. A device as in claim 1 further including means mounting the other of said two members for movement toward said first member in a path intersecting the position of one of said spaced arms whereby a front surface of said other member contacts one of said spaced arms to rotate the latch element to bring the other of said spaced arms into contact with a back surface of said other member to thereby bias said two members into non-rattling engagement.

References Cited by the Examiner

UNITED STATES PATENTS

| Re. 22,955 | 12/1947 | Penney | 289—38 X |
| 1,335,958 | 4/1920 | Farr | 292—78 |
| 1,463,743 | 7/1923 | Lankston | 298—38 |
| 1,642,203 | 9/1927 | Hilfinger | 292—198 X |
| 2,023,616 | 12/1935 | Riddel | 292—79 X |
| 2,833,578 | 5/1958 | Burke | 292—78 X |
| 2,848,263 | 8/1958 | Miller | 292—78 X |

FOREIGN PATENTS 1,090,135  9/1960  Germany.

ARTHUR L. LA POINT, *Primary Examiner.*

JAMES S. SHANK, LEO QUACKENBUSH, *Examiners.*